(12) United States Patent
Rayburn

(10) Patent No.: US 6,937,869 B1
(45) Date of Patent: Aug. 30, 2005

(54) ROUTE PLANNING SYSTEM FOR MOBILE TELECOMMUNICATIONS

(75) Inventor: Terry Rayburn, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 557 days.

(21) Appl. No.: 09/843,261

(22) Filed: Apr. 26, 2001

Related U.S. Application Data

(60) Provisional application No. 60/203,491, filed on May 10, 2000.

(51) Int. Cl.[7] .............................................. H04Q 7/20
(52) U.S. Cl. ................ 455/457; 455/456.3; 455/456.1; 455/414.3; 340/990; 340/995.23; 340/993; 701/200
(58) Field of Search .......................... 455/456.3, 456.1, 455/457, 414.1, 456.6; 340/993, 995.23, 340/990; 701/200–202, 209

(56) References Cited

U.S. PATENT DOCUMENTS

| | | | | |
|---|---|---|---|---|
| 5,155,689 | A | * | 10/1992 | Wortham ................. 455/456.3 |
| 5,353,023 | A | * | 10/1994 | Mitsugi ...................... 340/989 |
| 5,890,088 | A | * | 3/1999 | Nimura et al. ............... 701/211 |
| 6,029,069 | A | * | 2/2000 | Takaki ..................... 455/456.1 |
| 6,085,097 | A | * | 7/2000 | Savery et al. ............ 455/456.1 |
| 6,456,854 | B1 | * | 9/2002 | Chern et al. ................ 455/457 |
| 6,625,457 | B1 | * | 9/2003 | Raith ....................... 455/456.1 |
| 6,633,763 | B2 | * | 10/2003 | Yoshioka .................... 455/457 |
| 2001/0044310 | A1 | * | 11/2001 | Lincke ....................... 455/456 |
| 2001/0046884 | A1 | * | 11/2001 | Yoshioka .................... 455/564 |
| 2002/0160790 | A1 | * | 10/2002 | Schwartz et al. ............ 455/456 |
| 2002/0168986 | A1 | * | 11/2002 | Lau et al. ................... 455/456 |
| 2003/0216145 | A1 | * | 11/2003 | Cox et al. ................. 455/456.1 |

OTHER PUBLICATIONS

Lawrence Harte et al., "Cellular and PCS—The Big Picture," p. 11 (McGraw-Hill 1997).
Nicole Harris, "Snap Track Inc. Finds a Way to Locate Cell-Phone Callers,"*The Wall Street Journal*Jun. 25, 1999.
Finance Home—Yahoo!—Help, Yahoo Press Release, Mar. 27, 2001.
"Enhanced Wireless 9-1-1 Phase 2—J-STD-036", Electronics Industry Association/Telecommunications Industry Association, Jul. 2000.

* cited by examiner

*Primary Examiner*—William Trost
*Assistant Examiner*—Sharad Rampuria

(57) ABSTRACT

A route planning system for use in mobile telecommunications is disclosed. A user of a mobile station such as a wireless telephone, PDA, pager or computer, initiates a route planning service request and provides a destination telephone number. A switching center responsively initiates an asynchronous position request of a mobile positioning system, which identifies and stores the mobile station position. The switching center connects the mobile station to a route planning application server. The route planning application server obtains the mobile station position by querying the mobile positioning system. The route planning application server further obtains the destination telephone number and queries a location system to determine the destination position corresponding to the destination telephone number. The route planning application server in turn generates a route plan for travel from the mobile station position to the destination position and conveys the route plan to the user by any suitable means.

32 Claims, 4 Drawing Sheets

ROUTE PLANNING SYSTEM FOR MOBILE TELECOMMUNICATIONS

REFERENCE TO RELATED APPLICATIONS

The inventor claims priority to U.S. Provisional Patent Application No. 60/203,491, filed May 10, 2000.

BACKGROUND OF THE INVENTION

1. Field of the Invention

The present invention relates in general to telecommunications systems and more particularly to methods and systems for generating and providing route plans to a mobile telecommunications subscribers. The invention facilitates providing directions for a mobile telecommunications subscriber to travel from the subscriber's current location to a destination represented by a destination telephone number.

2. Description of Related Art

Recent developments in wireless telecommunications have ushered in a new era of mobility. The advent of cellular and personal communications services have enabled people to maintain communication from virtually any location. Further, advanced technology has facilitated not only wireless voice communication but also wireless data communication, such as the ability to communicate over computer networks and to send and receive faxes and text messages.

Wireless communications systems have existed for many years. In general, a wireless communications system uses mobile or fixed radios that communicate with a fixed radio tower that is in turn interconnected to a larger telecommunications network. Such systems can take a variety of forms. For example, traditional cellular communications systems provide radio coverage to a wide area, such as a city, through use of many radio towers. As another example, wireless office systems typically use 5 to 20 small radio base stations to offer radio coverage in small areas such as a school campus or hospital building. As yet another example, cordless telephones typically allow one handset to communicate with a single radio base station within a home. Most recently, personal communications services ("PCS") have arisen as an integration of cellular, wireless office and cordless with the addition of advanced information services.

Typically, subscribers to wireless service are equipped with one or more wireless terminals or mobile stations, which may take any of a variety of forms. By way of example, a mobile station may be a telephone, a pager, a computer, a personal digital assistant ("PDA"), or any combination of these or other devices. The mobile station may be arranged to receive and/or convey information such as voice and data (e.g., fax, e-mail and other text messages) and/or other media (e.g., audio, video and graphics) and may therefore include input and output facilities such as a touchpad, a keyboard, a camera, a display, a microphone and/or a speaker. Some advanced mobile stations recently available are even equipped with web browsing software to allow subscribers to communicate with web servers over the Internet.

In traditional cellular radio-telephone systems, geographic areas are split into smaller areas called cells, each of which is assigned a specific frequency range or code (e.g., pseudo-random number) for communication. Noncontiguous cells may reuse the same frequencies, thus avoiding interference between cells while making efficient use of allocated frequencies. The size and shape of each cell is defined by the range of a base station or radio port established by a wireless service provider at the core of the cell. Mobile stations are adapted to communicate over an air interface with these base stations, switching to the frequencies or codes of various cells as they travel from one cell to another. In addition, cells may be split into even smaller areas called sectors, by use of directional antennas or other technology.

One or more base stations in a given service area may be interconnected to a base station controller, which serves as an aggregation point for communications traffic. In turn, the base station controller is interconnected with a mobile switching center ("MSC"). The MSC is then interconnected to other switching points in the wireless network and/or a landline network, to facilitate interconnecting communications traffic between mobile stations and other switching points.

In use, when a mobile station is located in a given cell, the mobile station communicates with the MSC via the base station and base station controller. The MSC serves to interconnect traffic between the mobile station and other points in the wireless network or in another network. For instance, the MSC may convey traffic between two mobile stations in its service area; alternatively, the MSC may convey traffic between a mobile station in its service area and another switching point in the same or another network. (Alternatively, the base station controller may be interconnected to a transport network through another gateway, such as a packet data serving node (PDSN) for instance, thereby bypassing the MSC.)

As the mobile station moves from one cell to another, a hand-off takes place that allows that mobile station to be assigned a free channel in the new cell. In particular, as the signal strength between the mobile station and the base station controller becomes weaker, the MSC is informed. The MSC then initiates procedures to pass the connection to a cell that has a strong reception of the mobile station's frequency. Once the unit has been given a new channel in the new cell, the old channel in the old cell is released and made available for another user in that cell.

In order to facilitate call routing and billing in wireless communications systems, information about the subscriber and the mobile station is typically stored in a home location register ("HLR") in the subscriber's home service area. This information includes (i) unique identifiers of the mobile station (including mobile identification number ("MIN") and mobile serial number ("MSN")), (ii) profile information (including an identification of the calling services available to the mobile station, and billing information enabling wireless service providers to charge the subscriber for use of the services), and (iii) location information indicating the cell and sector in which the mobile station is currently located.

As the mobile station moves outside the home service area, the mobile station registers with a visitor location register ("VLR") in the current service area. The serving VLR in turn notifies the HLR of the current location (e.g., cell and sector) of the mobile station and obtains service profile information from the HLR. Thus, for instance, when a call is placed to the mobile station, the call can be relayed to an MSC in the mobile station's current service area as identified in the mobile station's HLR.

Most recently, wireless telecommunications networks have advanced to include intelligent network ("IN") technology similar to that used for years in the wireline telecommunications system. A core component of an IN is a service control point ("SCP"), which provides fast, centralized processing and acts as an interface into various telecommunications databases, including, in some arrangements, the HLR and VLR. The SCP may respond to call origination requests from an MSC by sending call-setup instructions to the MSC and facilitating other services.

While advances in wireless communications have advantageously given rise to increased mobility, an issue remains: how can a mobile subscriber determine how to get from the subscriber's current location to another location? Various methods of establishing route or travel plans exist. At a most basic level, the subscriber can consult a map, pinpoint his (or her) current location and a destination location, and manually generate a route plan to get from one location to the other. Unfortunately, however, mobile subscribers usually do not have access to maps as they travel. Further, although a mobile subscriber may know where he wants to go, the subscriber may not know where he is, or the subscriber may not be where he thinks he is. Additionally, the subscriber may not know the particular address of his destination. Still further, if the subscriber is driving, the subscriber may not be able to concurrently drive, refer to map, identify a route on the map, and record-directions.

Rather than consulting a map, the subscriber may use a specially equipped wireless communications device to contact a route planning service. For example, a mobile station may be specially equipped with hardware and software necessary to interact with the Global Positioning Satellite (GPS) system. With an appropriate arrangement, the subscriber could then specify a destination location, and the GPS system, knowing where the subscriber is located, could generate real-time directions to get the subscriber from his current location to the destination location.

As another example, provided with a wireless PDA or wireless computer that is arranged to provide Internet access, the mobile subscriber can navigate to a routing engine site on the world wide web and request directions. An example of an existing routing engine on the world wide web is located at www.mapquest.com and is hosted by MapQuest.com, Inc. Like other routing engines, the MapQuest site prompts a user to enter a starting address and a destination address. MapQuest then generates a map as well as turn-by-turn directions to travel from the starting address to the destination address. Additionally, MapQuest facilitates downloading the directions for use on a PDA.

Unfortunately, many mobile subscribers do not have access to the advanced wireless communications devices necessary to gain access to the GPS system or to an Internet site such as MapQuest. Further, most mobile stations are not currently equipped to enable a subscriber to enter text information such as starting and destination addresses. Still further, obtaining directions through interaction with an Internet site such as MapQuest suffers from some of the same deficiencies identified above. Namely, the subscriber may not know precisely where he is currently located or where he wants to go and may therefore be unable to provide the required input to the routing engine.

Still others have suggested having a subscriber communicate with a mapping or routing center in order to obtain directions. As described in Lawrence Harte et al., *Cellular and PCS— The Big Picture*, 11 (McGraw-Hill 1997), for instance, a dispatch center can provide directions to a subscriber automatically or upon request, and, unlike computer-based mapping systems, the directions can be adjusted for traffic, weather and construction changes. In particular, as explained by Harte et al., "Point to point message services can send directions directly to the requesting subscriber. The subscriber could use a map to find a reference marker . . . and enter the reference mark via the keypad. Dispatch centers would then send directions to the individual or multiple vehicles. The dispatcher could also send delivery directions to a truck or pickup directions for a taxi."

Unfortunately, this method also suffers from some of the same flaws identified above. Namely, the method assumes that the subscriber can identify where the subscriber wants to go (e.g., a reference marker from a map) and can readily provide that destination location in order to facilitate generation of a route plan.

The wireless telecommunications industry has recognized a need to provide location-based services. In this regard, the industry has fortunately been saddled with regulatory requirements that can facilitate some of those services. In particular, in 1996, the U.S. Federal Communications Commission handed down an "E-911" (enhanced 911) mandate, which requires that wireless carriers (i) identify the location of a mobile station from which a 9-1-1 emergency call is placed and (ii) deliver the location (as x, y coordinates) to the called 9-1-1 emergency center. The mandate was divided into two phases. According to Phase 1, the location must be identified with an accuracy of at least cell and sector. As this information is readily available from the HLR, Phase 1 presents little technical challenge. According to Phase 2, the location must be provided with an accuracy of at least 100 meters (or 50 meters for handset-originated methods such as GPS), which is far more granular than the cell and sector information maintained in the HLR. In response, the Telecommunications Industry Association (TIA) has now proposed a new standard for "Enhanced Wireless 9-1-1, Phase 2," now entitled "Wireless Enhanced Emergency Services" or "TIA/EIA/IS-J-STD-036" (J-STD-036), the entirety of which is hereby incorporated by reference.

According to J-STD-036, several new elements and messages are introduced into the wireless network to facilitate delivery of caller location to 9-1-1 emergency service centers. Two of the new elements are the mobile position center ("MPC") and the position determining entity ("PDE"). As defined by J-STD-036, the MPC "determines the position or geographic location of a wireless terminal using a variety of techniques. The MPC selects a PDE to determine the position of a Mobile Station (MS). . . . The MPC is the point of interface of the wireless network for the exchange of geographic position information." (See J-STD-036, Definitions and Acronyms"). The PDE in turn "determines the precise position or geographic location of a wireless terminal when the MS starts a call or while the MS is engaged in a call. Each PDE supports one or more position determining technologies. Multiple PDEs may serve the coverage area of an MPC and multiple PDEs may serve the same coverage area of an MPC utilizing different position determining technologies." (Id.)

J-STD-036 presents numerous call-flows detailing the signaling messages that may pass between MSs, MSCs, MPCs, PDEs and emergency services bureaus. Generally speaking, J-STD-036 specifies that a network entity (such as an MSC or an emergency services entity) may query the MPC for the location of a mobile station, and the MPC may in turn query the PDE for the location of the mobile station in order to provide a response to the querying network entity. By way of example, when a caller dials 9-1-1 from a mobile station, the originating MSC may send a position request to the MPC, and the MPC may responsively instruct the PDE to identify the location of the mobile station. In turn, the PDE may locate the mobile station and provide the requested position information to the MPC, the MPC may convey the position information to the MSC, and the MSC may forward the position information to the emergency services entity together with a call setup message. Thus, when a 9-1-1 services operator receives the call, the location of the calling subscriber may be displayed on a map at the operator's workstation.

The industry has recognized that the burden imposed by the FCC E-911 mandate can be leveraged to achieve not only safety but also commercial advantage. In particular, if the emergency services network elements are replaced with commercially useful elements (such as gateways to 4-1-1 information centers, short message services or the Internet), assorted location-based services may become possible. Those of ordinary skill in the art have thus contemplated as possible services: personal security and response, roadside assistance, 9-1-1 call routing, mobile yellow pages, stolen vehicle recovery, direction assistance, personal/commercial valuables monitoring and recovery, and carrier zone billing. (See, e.g., http://www.accucomw.com/h3.htm).

As a specific example, those skilled in the art have recognized that real-time location data facilitated by J-STD-036 may enable a telecommunications service provider to offer a "call routing to closest location" service. According to that service, a caller may dial a special service number from the mobile station. In response, a trigger in the network would cause the MPC to obtain the mobile station's current location and forward the location to a service bureau (e.g., an interactive voice response unit ("IVRU")) as the MSC routes the call to the service bureau. Upon connection, the service bureau would engage in a dialog with the caller, allowing the caller to specify a desired facility, such as a particular type of restaurant. In response, given the caller's current location (as provided by the MPC), the service bureau could identify the restaurant of that type closest to the caller. The service bureau could then either signal the MSC to forward the call to that restaurant or send directions to the caller for downloading to a mobile device such as a PDA.

SUMMARY OF THE INVENTION

Although the capability thus exists to provide powerful location based services for mobile subscribers, deficiencies still remain. In particular, in many cases, a subscriber may not know the precise location of his destination or may be unable to convey the precise location of his destination. Of course, if the subscriber wishes merely to be connected or directed to the nearest service facility of a type identified (e.g., the nearest pizza restaurant), then existing systems may meet the subscriber's needs. But often, a mobile subscriber may not want to go simply to the generic "nearest" facility. Instead, the subscriber may wish to go to a particular destination. Unfortunately, however, the only information that the subscriber may have about the destination may be the telephone number of the destination. This is particularly the case if the destination location is itself a mobile station.

The present invention solves this problem by providing an improved route planning system for mobile telecommunications. In accordance with an embodiment of the invention, a person may initiate a route planning service request from a mobile station to a route planning application server ("RPAS"). In response to the dialed digits of the service request, the MSC may trigger an asynchronous position request of the MPC. If the MPC does not have a current location for the person's mobile station, the MPC may acquire one through the PDE and store the location in a location database, keyed to an identifying-parameter such as a mobile station identifier or call identifier for instance.

In turn, when the call is completed to the RPAS, the RPAS may initiate a query of the location database to identify the location of the mobile station. In addition, the RPAS may engage in a data-session or voice-session dialog with the person in order to determine the telephone number of the destination. Provided with the destination telephone number, the RPAS may initiate a query of an appropriate database to determine the location of the destination. If the destination telephone number is a wireless number, then the RPAS may send a position request to an MPC, which may consult a PDE and return the position of the destination mobile station. If the destination telephone number is a wireline number, then the RPAS may query a wireline location server to determine the service address of the destination telephone number.

Provided with the locations of the mobile station and the destination, the RPAS may then establish a route plan for the person to get to the destination location. In turn, the RPAS may deliver the route plan to the person by any suitable means. In one embodiment, for instance, the RPAS may convey the route plan to the person via the existing connection between the mobile station and the RPAS. In another embodiment, the RPAS may convey the route plan to the person by sending the route plan in synthesized voice form to the person's voice mail box for later retrieval and replay. In yet another embodiment, the RPAS may convey the route plan to the person by sending the route plan in text form to the person via conventional short message service for later retrieval and replay.

More particularly, the present invention may be a method of responding to a route planning service request initiated from a mobile station, where the mobile station is located at a mobile station position, and the route-planning service request defines an identifying-parameter. Further, the mobile station may be a wireless telephone, a personal digital assistant, a pager, a personal computer, or another device. The method may include (i) identifying the mobile station position based on the identifying-parameter, (ii) receiving a destination telephone number, (iii) identifying a destination position corresponding to the destination telephone number, (iv) generating a route plan for travel from the mobile station position to the destination position, and (v) conveying the route plan for receipt by a person.

According to an exemplary embodiment, the identifying-parameter may comprise a code uniquely identifying the mobile station or a code uniquely identifying a communication session in which the mobile station is engaged. Further, the process of identifying the mobile station position based on the identifying-parameter may comprise (i) a mobile positioning system determining the position of the mobile station having the mobile station identifier, and (ii) a machine querying the mobile positioning system by a query keyed to the identifying-parameter so as to obtain the mobile station position determined by the mobile positioning system.

In addition, receiving a destination telephone number can take various forms. For example, it may comprise receiving the destination telephone number from the person via the mobile station. As another example, it may comprise (i) a machine engaging in a dialog with the person via a communications link with the mobile station and (ii) the machine receiving the destination telephone number from the person through the dialog. In that case, the dialog could be a data session or a voice session. In a voice session, the mobile station could display a data form in which the person enters the destination telephone number, and the mobile station could convey the entered destination telephone number via the data session to the machine. In a voice session, the machine could verbally ask the person for the destination telephone number and the person could responsively provide the destination telephone number to the machine by a voice-band message, such as through voice over IP.

Still further, identifying a destination position corresponding to the destination telephone number may comprise a machine querying a location system for the destination position by a query keyed to the destination telephone number. In that regard, the destination telephone number could be a telephone number of a second mobile station, and the location system could comprise a mobile positioning system, such that the mobile positioning may responsively determine a location of the second mobile station and return the location to the machine as the destination position. Alternatively, the destination telephone number could be a landline telephone number, and the location system may comprise a landline location system, such that the landline location system may responsively determine a location corresponding to the landline telephone number and return the location to the machine as the destination position.

Further, the mobile station position may be represented by latitude and longitude information. In that case, the method may include converting the mobile station position to a street address corresponding to the latitude and longitude.

In addition, the process of generating a route plan for travel from the mobile station position to the destination position may comprise applying a routing engine, and the routing engine may receive as input the mobile station position and the destination position and provide as output a route plan. To apply the routing engine, a service request may be sent to a routing engine such as MapQuest.com (or others, such as Mapsonus.com (http://www.mapsonus.com) or Mapblast.com (http://www.mapblast.com, powered by Vicinity Corp.)), for instance, to trigger the route generation. Alternatively or additionally, applying the routing engine could involve running a software application programmed to compute a route from a starting position to a destination position. (Alternatively, rather than actually computing a route from one location to another, the act of "generating" or "establishing" a route plan for travel from one location to another can simply be the act of obtaining or requesting such a route plan, without regard to who or what computes the route.)

Finally, conveying the resulting route plan for receipt by a person could comprise conveying the route plan to the person via an IP network connection or via service such as voice mail, e-mail or short message service. In addition, conveying the route plan for receipt by a person may involve sending the route plan to machine for later retrieval by the person.

In another exemplary embodiment, the invention may be a route planning application server for assisting a mobile station user to get from a current mobile station position to a destination position. The route planning application server may comprise (i) a processor, (ii) a data storage medium, and several sets of machine language instructions stored in the data storage medium and executable by the processor. A first set of instructions may facilitate receiving a route planning service request and responsively initiating a route planning session. A second set of instructions may facilitate providing a mobile station position inquiry and for receiving in response an indication of the mobile station position, so that the mobile station position inquiry may be forwarded to a mobile positioning system for identification of the mobile station position. A third set of instructions may facilitate receiving a destination telephone number and responsively initiating a inquiry to identify a destination position corresponding to the destination telephone number. A fourth set of instructions may facilitate generating a route plan for travel from the mobile station position to the destination position. And a fifth set of instructions may facilitate providing the route plan for receipt by the user. In this way, the route plan may advantageously assist the user to travel from the mobile station position to the destination position.

In addition to generating and providing a user with a route plan to indicate how to get from one location to another, the present invention can be applied to provide route guidance, which involves monitoring the source position as it changes and providing incremental route planning. For instance, with the benefit of the present invention, a route planning server can determine a destination location based on a destination phone number and then incrementally provide travel guidance for a mobile station to get to that location as the mobile station proceeds to the location.

Similarly, the route planning or route guidance system of the present invention can take into consideration real time traffic conditions, to assist a mobile user in traveling by car to a destination location. In this regard, for instance, the route planner itself could be mounted in whole or in part within an automobile, and the route planner could communicate over a wireless network with a network entity that could convert a destination telephone number to a destination address. The route planner could then generate a route and present it to a driver.

According to another aspect, an exemplary embodiment of the present invention can enable one person to create a route plan on behalf of another person. For instance, a person could call a route planning service from a landline telephone and arrange for a route plan to be conveyed to a particular mobile station identified by a mobile identification number, directory number or the like. Alternatively, a personal information manager (PIM) application could be programmed to automatically send a route planning request (including a telephone number of the destination location) to a route planner, such as at a particular time, on a particular day or the like.

Further, the route planning service according to an exemplary embodiment of the invention can be made available to users over the Internet. The route planning service could be accessed via XML, Java, or other function calls or methods for instance.

Aspects and advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which.

DETAILED DESCRIPTION OF AN EXEMPLARY EMBODIMENT

Figure 1:
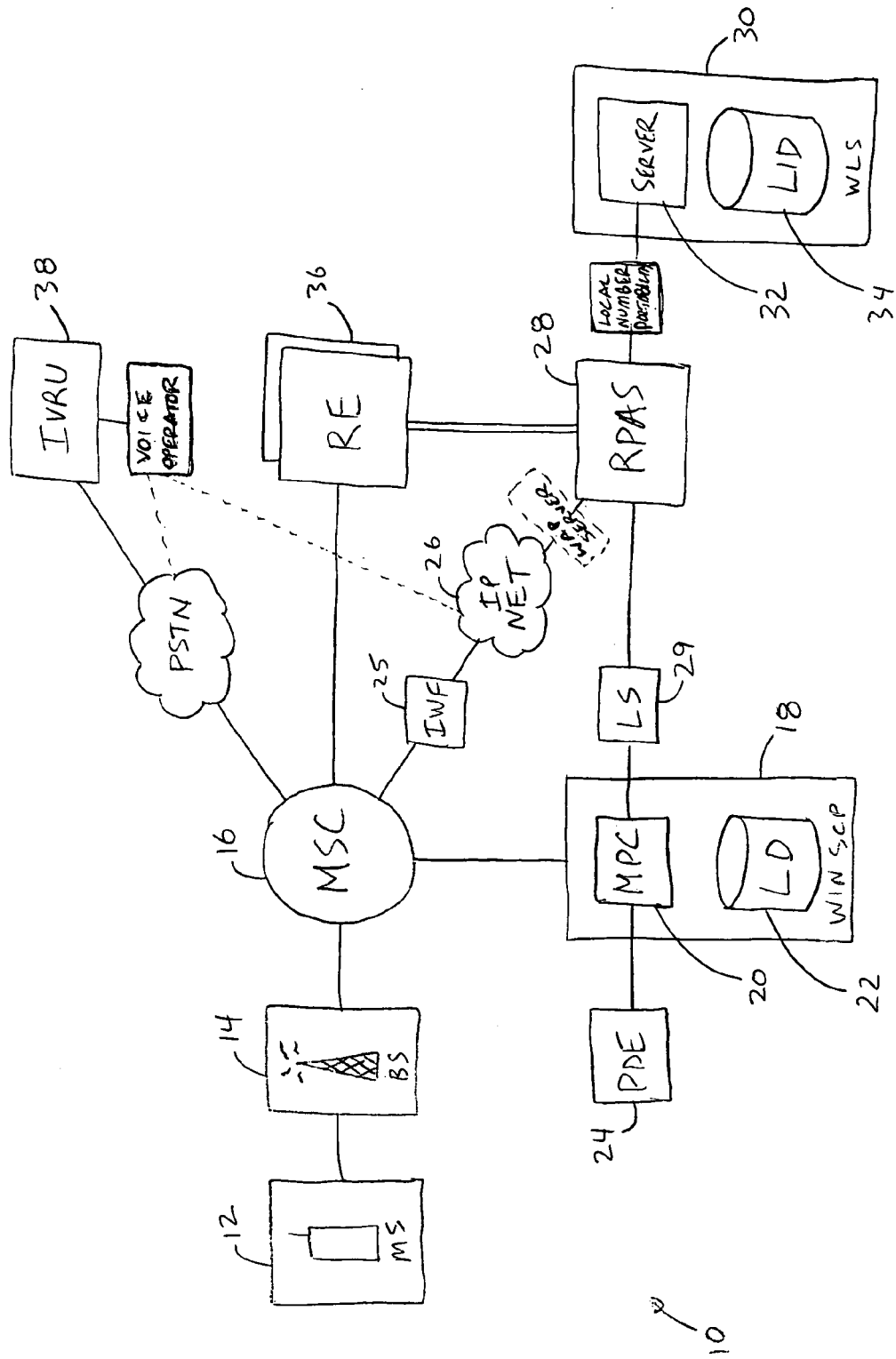
FIG. 1 is block diagram illustrating an exemplary telecommunications network for providing route planning services in accordance with an exemplary embodiment of the present invention.

Referring to drawings in greater detail, FIG. 1 illustrates a functional block diagram of an exemplary telecommunications network 10 for providing route planning services to a mobile telecommunications subscriber. As shown in FIG. 1, network 10 includes a mobile station ("MS") 12, a base station ("BS") 14, a mobile switching center ("MSC") 16, a wireless intelligent network service control point ("WIN SCP") 18 (including a mobile positioning center ("MPC") 20 and location database ("LD") 22), a position determining entity ("PDE") 24, an IP network 26, a route planning application server ("RPAS") 28, a wireline location server ("WLS") 30 (including a server 32 and a location information database ("LID") 34), and a reporting entity ("RE") 36.

This and other arrangements described herein are shown for purposes of illustration only, and those skilled in the art will appreciate that other arrangements and other elements can be used instead, and some elements may be omitted altogether. Further, as in most telecommunications applications, those skilled in the art will appreciate that many of the elements described herein are functional entities that may be implemented as discrete components or in conjunction with other components, in any suitable combination and location.

Referring to the elements shown by way of example in FIG. 1, MS 12 may be any radio technology unit including but not limited to a cellular telephone or other equipment such as a pager, computer, or personal digital assistant ("PDA") equipped to engage in communications over a radio interface. MS 12 may operate according to any communications protocol now known or later developed, including for instance AMPS, NAMPS, TDMA,CDMA and/or cdma2000. In the exemplary embodiment, MS 12 is capable of transmitting and receiving both voice and data. Therefore, MS 12 may be equipped with hardware, firmware, software, a touch-pad, a keyboard, a camera, a display, a microphone, a speaker, and/or other facilities necessary to carry out its functions as described herein.

The particular arrangement of MS 12, like other elements described, may vary from case to case. For instance, if MS 12 is a cellular telephone, it might have a conventional 7 line text display. On the other hand, if MS 12 is a PDA, it is more likely to have a larger display with expanded graphics capabilities. Other examples are possible as well.

Upon call origination or termination, MS 12 becomes coupled with a serving MSC 16 via BS 14 and possibly a base station controller ("BSC") (not shown; possibly incorporated into MSC) by means well known to those skilled in the art. The BS is a network provider's access node to the mobile station and is sometimes called a radio port ("RP"). The interface between the MS and the BS is a radio or air interface. The BS, BSC and MSC are typically linked by fractional T1/E1 lines via "A" interfaces as defined by IS-41, IS-634 and IS-653 for instance.

MSC 16 is a functional entity that incorporates switching functions, mobile application functions and other service logic functions. Examples of suitable mobile switching centers are those manufactured by Northern Telecom, Lucent Technologies, and Motorola. By convention, MSC may be programmed with a number of IN triggers and signaling protocols to interact with other entities in the telecommunications network. MSC 16 will typically include a visitor location register ("VLR") to serve mobile subscribers that travel to its service area.

In the exemplary embodiment, MSC 16 is coupled with WIN SCP 18 by a "B interface" as defined by IS-41 for instance. SCP 18 may conventionally translate call origination requests to routing instructions for MSC 16. In addition, SCP 18 may be arranged to communicate with other SCPs (not shown) in the telecommunication network, for purposes of exchanging information with the other SCPs. For instance, to facilitate routing a call to a wireless destination, SCP 18 may communicate with an SCP serving as the called party's home location register ("HLR") in order to determine where the called party is currently located and to identify the called party's service profile.

In the exemplary embodiment, SCP 18 includes or has access to an MPC 20 and LD 22, although these functional entities may be combined. MPC 20 is preferably a database application executed by or in connection with the SCP processor and serves to obtain and maintain the position or geographic location of wireless terminals such as MS 12, as described above. Generally speaking, MPC 20 may be arranged to receive and respond to position requests, to receive position information, to store the position information in LD 22, and to forward the position information to other functional entities in the network. As noted above, J-STD-036 defines an MPC to be a point of interface in the wireless network 10 for the exchange of geographic position information. The MPC may provide geographic position information as latitude and longitude coordinates ("geocodes"), as street addresses, or in any other suitable form. An example of a suitable MPC is the MPC function in SignalSoft's Location Manager as delivered in the "Compaq Location Discovery System," available from Compaq Computer Corporation. Other examples may exist or be developed as well.

In an alternative arrangement, an MPC application may reside on, or be accessible by, a centralized SCP (i.e., an SCP/MPC) and may be shared by many SCPs. In that case, SCP 18 could communicate with the designated SCP when necessary to obtain position information from the MPC. For instance, if MSC 16 wishes to determine the position of a mobile subscriber, MSC 16 may send a position request to a local SCP, and the local SCP may in turn forward the position request to the centralized SCP/MPC. Upon receipt at the centralized SCP, the MPC may forward the position request to a PDE and obtain the requested position information in response. The SCP/MPC may then return the position information to the local SCP 18, which may in turn forward the position information to MSC 16.

In practice, MPC 20 selects and communicates with one or more PDEs 24 in order to obtain position information. As noted above, PDE 24 may serve to determine the precise position or geographic location of a wireless terminal either when requested (such as when a wireless terminal starts a call or is engaged in a call) or autonomously. A PDE may employ any suitable positioning determining technology. Examples of suitable position determining technologies presently known include Time Difference of Arrival (TDOA) and Global Positioning Satellite (GPS) systems. In addition, another position determining system has been described in U.S. Pat. No. 5,844,522 (entitled "Mobile Telephone Location System and Method"), the entirety of which is hereby incorporated by reference. Still other examples of suitable PDEs may now exist or be created in the future. Of course, the degree of precision of location determination is a matter of design choice, and it is expected that improved position determination technology may facilitate much more granular location of wireless terminals in the future.

MSC 16 may communicate with an interactive voice response unit or other voice portal ("IVRU"), on a service node ("SN") for instance, which can engage in a voice session with the mobile station user in order to obtain the phone number of a destination to which the subscriber wishes to travel. (A service such as that provided by Tellme Networks, Inc. (www.tellme.com) could be leveraged for this purpose.) In this regard, the user may provide the destination telephone number in any suitable form, such as by voice, DTMF key input, voice synthesis and recognition, or other voice-band communication. In an exemplary embodiment, the IVRU may be centrally located and its services shared by many MSCs. Further, an IVRU can be arranged as an intermediary that rolls over to an operator who can then receive a destination telephone number from the user and input the destination telephone number on the user's behalf. The operator's terminal may also be coupled for communication with the PSTN and the IP network. An example of a suitable IVRU platform is available from Brite.

If provided, the IVRU (as a functional entity) may be located at any suitable location, and the MSC may therefore be coupled with the IVRU through any suitable communications link. By way of example, FIG. 1 illustrates an IVRU 36 coupled to MSC 16 via the public switched telephone network ("PSTN"). As another example, the UVRU can be directly connected to the MSC, via a private network. As still another example, the IVRU may be integrated, coupled or otherwise in communication with the RPAS 28 and may thereby communicate with the mobile subscriber through a suitable MS connection to the RPAS. For instance, if MS 12 is connected to the RPAS 28 through an IP network, the IVRU may communicate with the subscriber via a voice-over-IP ("VoIP") session across the IP network. Of course, other arrangements are possible as well.

MSC 16 may complete a call (i.e., set up a session) from MS 12 to RPAS 28 through any suitable communications link and with any suitable communications protocol (such as TCP/IP, SS7, etc.) As an example, FIG. 1 illustrates that MSC 16 and RPAS 28 may be linked by an IP network 26 such as the Internet. In this regard, the MSC and RPAS may communicate according to the well known TCP/IP protocol for instance.

To facilitate TCP/IP data communication over the IP network, the MSC may be coupled (via an Ethernet T100 line, for instance) with an interworking function ("IWF") 25 or wireless access gateway (WAG). The IWF may provide interworking and protocol conversions necessary to couple a circuit switched network (such as a CDMA network) on one side with a packet switched network (such as the Internet) on the other side. The IWF can therefore facilitate end-to-end communication over the IP network between MS 12 and RPAS 28 for instance.

An example of a suitable IWF is the Total Control™ Interworking Function manufactured by 3Com Corporation. As described by 3Com, the Total Control™ IWF enables a CDMA carrier to provide modem-based data and facsimile services to circuit-switched CDMA wireless users as specified in CDMA data standards. In addition, according to 3Com, the Total Control™ IWF provides a "Quick Net Connect" function that allows a mobile station user to bypass modems altogether and rapidly establish direct connections to Internet- or intranet-based information. Additional information about the Total Control™ IWF is available on the world wide web at http://www.3com.com/solutions/svprovider/products/rac/wireless.html.

Alternatively, an IP session between MS 12 and RPAS 28 can be established in other ways. For example, as noted above, the base station controller could be coupled with a PDSN, which provides connectivity with the Internet. MS 12 can then establish a communication session with RPAS 28 through a path extending through the air interface, BS, BSC, PDSN and the Internet.

Figure 2:
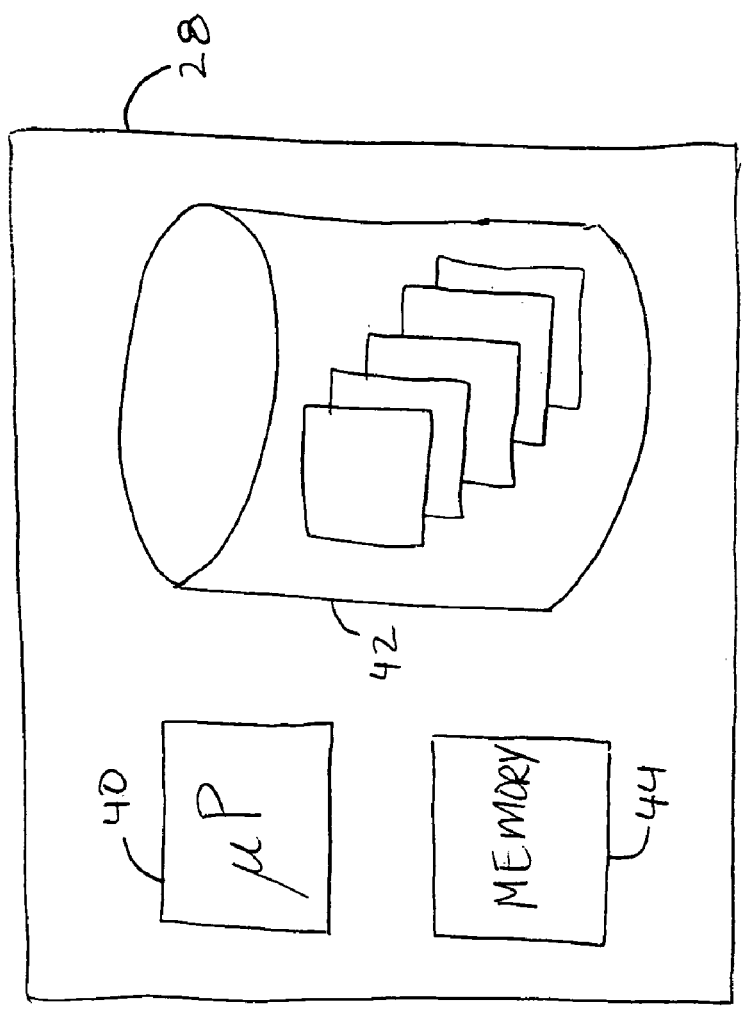
FIG. 2 is a block diagram illustrating an exemplary route planning application server in accordance with an exemplary embodiment of the present invention.

RPAS 28 may take any suitable form. By way of example, RPAS 28 may be (or include) a computer such as a Sun Microsystems server or a Pentium class PC. A functional block diagram of an exemplary RPAS 28 is illustrated in FIG. 2. Referring to FIG. 2, RPAS 28 may include a processor 40, a data storage medium 42 and a memory 44. Data storage medium 42 may be a hard drive or other suitable medium holding one or more sets of machine language instructions that can be loaded into memory 44 and executed by processor 40. Provided with the present disclosure, those of ordinary skill in telecommunications and computer programming should be able to readily prepare an appropriate set of machine language instructions.

The machine language instructions executed by processor 40 may define an application program that causes RPAS 28 to respond to a route planning service request, for instance, by determining the location of MS 12, determining the location of a destination to which the mobile subscriber wishes to go, generating a route plan to get from the MS location to the destination location, and conveying the route plan to the subscriber. More particularly, by way of example (and without limitation), the machine language instructions may define at least the following routines: (i) a main routine that responds to a route planning service request from MS 12 by initiating a route planning session that comprises the following routines, (ii) a mobile station position inquiry routine that generates a mobile station position inquiry and receives in return an indication of the mobile station position, (iii) a destination telephone number input routine that receives a destination telephone number and responsively initiates an inquiry to identify a destination position corresponding to the destination telephone number, (iv) a route generation routine that generates a route plan for travel from the mobile station position to the destination position, and (v) an output routine that conveys the route plan for receipt by the user.

In addition, the machine language instructions may define a routine that causes RPAS 28 to convert position information from one form to another, for instance, to put the position information in the form necessary for input to a routing engine. For instance, if RPAS 28 receives position information in the form of a geo-code, RPAS 28 may be programmed to convert the information to a street address (e.g., by reference to a commercially available mapping database).

Still further, the machine language instructions may define a routine that causes RPAS 28 to determine whether a given telephone number is a wireline telephone number or a wireless telephone number. For instance, the routine may cause the RPAS 28 to initiate a query into a database system keyed to directory numbers. In this regard, directory numbers are typically divided by ranges into wireless numbers and wireline numbers. Therefore, a query keyed to the directory number may return an indication of whether the number is assigned to a mobile station or a fixed landline station. Alternatively, a central database may otherwise identify whether a given number is assigned to a wireless or wireline station.

The machine language instructions may dictate that processor 40 carry out some or all of the foregoing functions. Alternatively, the machine language instructions may dictate that the RPAS 28 outsource some or all of these functions to other entities in the network (e.g., through function calls or subroutine calls to external devices coupled across any suitable link). For instance, in order to convert latitude and longitude information provided by MPC 20 into street address information, RPAS 28 may communicate via the Internet with an application running on a remote system that is designed specifically to perform such translations. Similarly, in order to establish a route plan to get from a first street address to a second street address, RPAS 28 may communicate via the Internet or other link with a route planning service such as MapQuest.com.

RPAS 28 may further operate as an Internet server (e.g., a web server, a WAP server, or other form of server) to MS 12, when MS 12 is in communication with RPAS 28 over IP network 26. In that case, MS 12, alone or in combination with an adjunct device such as a computer or PDA, may run a web browser application so as to facilitate exchange of information between the mobile subscriber and the RPAS. For example, the MS 12 might be programmed with a WAP browser or the like, which might communicate with the RPAS via a WAP server. Still further, although not shown in the figures, RPAS 28 may be integrated with a mobile information center (e.g., a directory assistance center) and interfaced with one or more operator workstations. A mobile station user may then initiate a route planning service request by calling the mobile information center and asking an operator to provide directions to a given destination telephone number. In turn, the operator may engage in communication with the RPAS 28 on behalf of the mobile station user.

In the exemplary embodiment, RPAS 28 may further be coupled by a TCP/IP link to WLS 30, which may include a server 32 and LID 34. WLS 30 may be a high availability computer such as a system manufactured by Stratus or Tandem/Compaq. WLS 30 may serve to translate wireline telephone numbers into the fixed service addresses or geocodes where the telephone numbers are located. For this purpose, WLS may embody or include copies of Line Information Databases (LIDBS) or Master Street Address Guides (MSAGs) from throughout the service area (e.g., throughout the United States). LIDBs typically include tables of information mapping wireline telephone numbers with names and street addresses and are often used in the wireline system to facilitate maintenance of equipment at the respective addresses. A local number portability database may indicate which carrier's LIDB should be referenced for a given telephone number, for instance. Thus, RPAS 28 may usefully query the WLS server 32 (or cause the server to be queried) in order to translate wireline destination telephone numbers into street addresses or geo-codes at which the numbers are located.

Alternatively, RPAS 28 could query a reverse lookup service on the Internet, to determine the address that corresponds with a given telephone number. The RPAS could provide the telephone number, and the reverse lookup service could then return to the RPAS a corresponding street address for use in route planning. Exemplary reverse lookup services include those available at http://www.nearme.com and http://www.switchboard.com.

RPAS 28 may further be coupled by any suitable communications link to MPC 20 (e.g., SCP 18). As an example and without limitation, the link may be a conventional telephone network operating according to the SS7 protocol. As another example, the link may be a TCP/IP link such as the Internet. A location storefront ("LS") 30 may then be provided between the RPAS and the MPC to convert between transmission protocols and to serve as a firewall to prevent unauthorized traffic from reaching the SCP/MPC. LS 29 may take any suitable form such as a programmed NT class PC, or better, for example.

In an exemplary embodiment, RPAS 28 may send position requests to MPC 20 to determine the location of mobile stations. In this regard, if RPAS 28 is coupled directly with MPC 20, RPAS 28 may with MPC 20 through request and response messages that comply with the conventions established by J-STD-036. For instance and without limitation, RPAS 28 may send a position request to MPC 20 to determine the location of a mobile station identified by a unique mobile station identifier (e.g., a mobile identification number ("MIN")). As another example, if the MPC was provided with a unique route planning session identifier for the route planning request initiated by the user at MS 12, the MPC may have stored the position of MS 12 in a table keyed to the route planning session identifier. In that case, RPAS 28 may send a position request keyed to the route planning session identifier. In response, the MPC should return position information identifying the location of the designated mobile station.

Alternatively, if RPAS 28 is not coupled directly with MPC 20 but is instead coupled to MPC 20 through LS 29, then LS 29 may arranged to receive a position request query from RPAS 28 (e.g., via a TCP/IP link) and to in turn query MPC 20 for the requested position information.

On receipt of the requested position information, LS 29 may then return the position information to RPAS 28.

In some instances, RPAS 28 might not have the MIN of the MS 12. For instance, in a typical web session, a wireless carrier will not provide a mobile station's MIN to a web application provider. Instead, the carrier may assign some other identifying-parameter to identify the mobile station (a subscriber ID, typically an encrypted MIN) or the session (a session ID). When RPAS 28 does not have the MIN of the mobile station, RPAS 28 can be programmed to send a signaling message to an uplink server operated by the wireless carrier, asking the wireless carrier to provide the MIN that corresponds to the designated identifying-parameter. The uplink server may then look up or otherwise determine the MIN, by reference to the identifying-parameter, and return the MIN to the RPAS. Alternatively, the uplink server may, without revealing the MIN to the RPAS, look up the location of the mobile station (e.g., by querying an MPC, similar to that described above), and provide the location to the RPAS. Other arrangements are possible as well.

Still further, RPAS 28 may be coupled by any suitable communications link with RE 36. Again by way of example and without limitation, the communications link between RPAS 28 and RE 36 may be a conventional signaling network such as SS7. Alternatively, as another example, the link may be a TCP/IP link such as the Internet. As shown in FIG. 1, RE 36 may comprise one or more independent components, which may be arranged to communicate with RPAS 28 through one or more independent communications links. RE 36 may take any suitable form but is preferably arranged to convey messages for receipt by a person. As examples, RE 36 may be a short message service ("SMS") server, a voice mail ("VM") server, and/or an e-mail server. Examples of these devices are well known to those skilled in the art.

RE 36 may be arranged to convey messages directly to MS 12 for receipt by the user. Alternatively, RE 36 may be arranged to hold messages for later retrieval by a person. Thus, once RPAS 28 establishes a route for the mobile station user, RPAS 28 may convey the route for receipt by the user via an ongoing session with MS 12 over IP network 26 or via RE 36, for immediate or delayed retrieval by the user.

Figure 3:
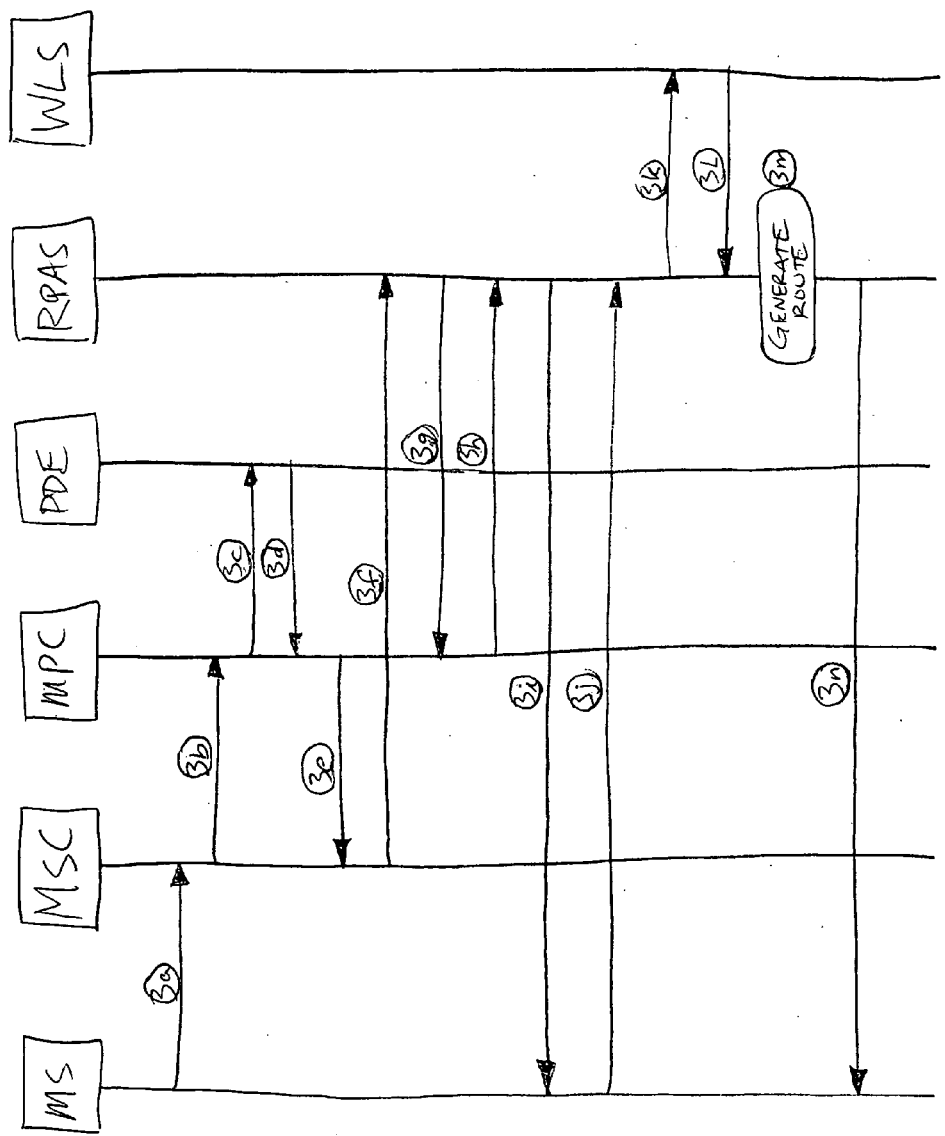
FIG. 3 is a call-flow diagram illustrating signaling messages that may be conveyed between functional entities of a telecommunications network to provide a route plan for travel from a mobile station position to a landline telephone number position in accordance with an exemplary embodiment of the present invention.
Figure 4:
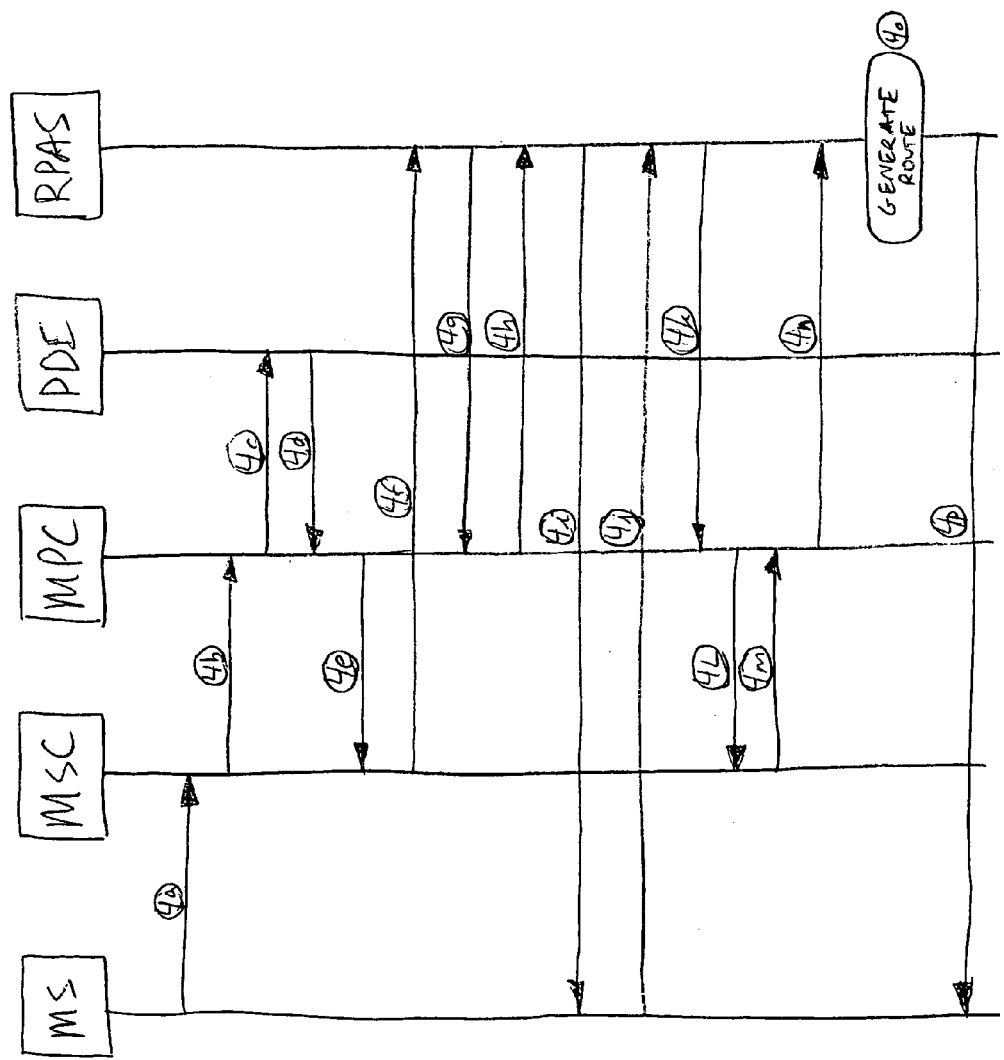
FIG. 4 is a call-flow diagram illustrating signaling messages that may be conveyed between functional entities of a telecommunications network to provide a route plan for travel from a first mobile station position to a second mobile station position in accordance with an exemplary embodiment of the present invention.

Referring now to FIGS. 3 and 4, there are shown two call-flow diagrams illustrating the operation of a route planning system in accordance with exemplary embodiments of the present invention. FIG. 3 represents a call-flow that may occur when a mobile station user wishes to obtain a route plan for travel to the location of a wireline destination telephone number. FIG. 4 represents a call-flow that may occur when a mobile station user wishes to obtain a route plan for travel to the location of a wireless destination telephone number. Any suitable entity in the network may make the determination of whether the destination telephone number is a wireline number or a wireless number. By way of example, once RPAS 28 initially receives a route planning service request, RPAS 28 may make this determination by reference to a suitable database table.

Just as the block diagrams of FIGS. 1 and 2 were set forth for purposes of illustration only, so too are the call-flows of FIGS. 3 and 4. Although the elements of the call-flows are described herein as steps, the order of the elements may not necessarily be significant. Further, those skilled in the art should appreciate that other call-flows may be implemented instead.

Referring first to FIG. 3, at step 3a, typically at the direction of a user, MS 12 may initiate a route planning service request by any suitable means, such as by sending dialed digits to MSC 16. The dialed digits may take any suitable form. By way of example, a wireless carrier may program MSC 16 and/or other entities in the network to recognize a feature code or service code such as *1234 or a conventional number such as 555-1234 as the initiation of a route planning service request.

In another embodiment, MS 12 may convey as part of the route planning service request an indication of the destination telephone number to whose location the user wishes to go. In this regard, for instance, the destination telephone number may be pre-pended or post-pended to the dialed digits that form the base request for service. Thus, for example, a user may cause the mobile station to send the digits *1234-123-4567 to MSC 16 in order to initiate a route planning service request to obtain a route for travel from the current mobile station position to the position of telephone number 123-4567. A wireless carrier may program MSC 16 and/or other entities in the network to recognize the pre-pended or post-pended number and to convey the number as a parameter when routing the call from MS 12 to RPAS 28 as will be described below.

At step 3b, in response to the dialed digits provided by MS 12, a trigger programmed at MSC 16 may cause MSC 16 to send a position request to MPC 20 seeking identification of the position of MS 12. In sending the position request, MSC 16 may instruct MPC 20 to store the result (i.e., the position information) for later reference. As an alternative example, in response to any dialed digits received from MS 12, a trigger programmed at MSC 16 may cause MSC to send a conventional call origination signal to SCP 18. In turn, SCP 18 may be programmed to recognize the dialed digits as a request for route planning service and may responsively (i) instruct MPC 20 to get and store the position of MS 12 and (ii) instruct MSC 16 to route the call to RPAS 28.

In an exemplary embodiment, MSC 16 and/or SCP 18 will provide the MPC with an identifying-parameter that may be later used as a key to correlate with the mobile station position (i.e., the position of MS 12) that the MPC will obtain. The identifying-parameter may take any suitable form. As an example, the parameter may uniquely identify MS 12 (such as the mobile identification number ("MIN"), a subscriber ID, the directory number ("DN") of the mobile station, the IP or other network address of the mobile station, or a session ID, for instance). As another example, the parameter may uniquely identify the route planning service session initiated from MS 12 (such as any unique identifying number).

At step 3c, MPC 20 may determine whether the current location of MS 12 is already stored in LD 22. If not, then MPC 20 may send a position request to PDE 24, requesting PDE 24 to determine and return the position of MS 12. PDE 24 may then apply any suitable position determining technology to locate MS 12 and, at step 3d, return the position information to MPC 20. MPC 20 may then cause the position information to be stored in LD 18 for later reference. In turn, at step 3e, MPC may send an acknowledgement message to MSC 16 in response to the position request message.

Although not shown in FIG. 3, MSC 16 may be instructed (by an internal trigger or by a message from SCP 18 for instance) to route the call from MS 12 to IVRU 38 in order to allow IVRU 38 to collect a destination telephone number from the mobile station user. IVRU 38 may then forward the destination telephone number back to MSC 16 as a parameter for MSC 16 to forward to RPAS 28. In the exemplary embodiment, however, IVRU 38 is not used; instead, RPAS 28 may itself engage in a voice or data session with MS 12 to learn the destination telephone number, unless the number was already provided.

At step 3f, MSC 16 may route the call from MS 12 to RPAS 28. In an exemplary embodiment, MSC 16 may route the call via IWF 25 and IP network 26 so as to establish a QuickConnect data session between MS 12 and RPAS 28.

Upon completion of the call to RPAS 28, at step 3g, RPAS 28 may send a position request to MPC 20 to learn the position of MS 12. In the exemplary embodiment, RPAS 28 may send as a parameter in this position request the identifying-parameter noted above. In this way, the MPC 20 will be able to retrieve the appropriate mobile station position from LD 22. At step 3h, MPC 20 then responds to RPAS 28, providing the requested mobile station position. In a typical scenario, the mobile station position information provided by MPC 20 will be latitude and longitude coordinates of MS 12. According to the exemplary embodiment, RPAS 28 may then convert these coordinates to the nearest street address to MS 12, if necessary for use as input to a routing engine for instance.

At step 3i, through the QuickConnect data session, RPAS 28 may send a destination number request to MS 12, requesting the destination telephone number to whose destination the mobile station user wishes to travel. And at step 3j, MS 12 may provide the requested destination number. This request and response may be sent in any suitable form. For example, if MS 12 is appropriately equipped (such as with a WAP or HDML client application), RPAS 28 (in cooperation with a WAP server) may send an WAP card for display at MS 12, requesting the mobile station user to input the destination telephone number. The number may then be transmitted as pure data to RPAS 28. As another example, RPAS 28 may employ an UVRU or other suitable voice system to engage in a VoIP voice session with the mobile station user. Of course, other alternatives may exist depending on the communications link between MS 12 and RPAS 28 and other factors.

At step 3k, RPAS 28 may initiate a query of WLS 30 to determine the street address at which the destination telephone number is located. In response, at step 31, WLS 30 responds with the requested street address. According to the exemplary embodiment, RPAS 28 may then convert this street address to latitude and longitude coordinates of MS 12, if necessary for use as input to a routing engine for instance. Alternatively, RPAS 28 may query WLS 30 for the geo-code indicating the coordinates where the destination number is located, and RPAS may thereby avoid having to translate a street address to location coordinates.

At step 3m, provided with the mobile station position and the destination position, RPAS 28 may next generate a route plan for travel from the mobile station position to the destination position. For this purpose, RPAS 28 may itself run an application program designed to generate a route plan. Alternatively, RPAS 28 may outsource the task to another entity, such as MapQuest.com. Thus, for instance, RPAS 28 may establish an Internet connection with the MapQuest.com server and provide as input the street addresses of the mobile station position and destination position. In turn, MapQuest.com may return to RPAS 28 a step-by-step set of directions to get from the mobile station position to the destination position. Of course, RPAS 28 may employ any other suitable means to generate the desired route plan based on the mobile station position and destination position. Further, the route plan itself may take any suitable form. For instance and without limitation, the route plan may be a text file, a graphic of a map, or a set of voice instructions.

Finally, at step 3n, RPAS 28 may convey the route plan to MS 12 or otherwise for receipt by the mobile station user or another person for instance. RPAS 28 may use any suitable means to convey the route plan. As an example, if RPAS 28 is engaged in a voice session with the mobile station user, RPAS 28 may simply read the route plan to the mobile station user. Alternatively, if RPAS 28 is engaged in a pure data session with the mobile station user, RPAS 28 may send the route plan as one or more data messages for receipt by the mobile station user. For instance, RPAS 28 may send the route plan as a WAP card to be displayed at MS 12 for viewing by the mobile station user. Other examples may exist as well.

Turning now to FIG. 4, the illustrated call-flow depicts an exemplary scenario where a mobile station user initiates a route planning service request to obtain directions for travel to the location of a wireless telephone number. Steps 4a–4j and 4o–4p may be substantially the same as, if not identical to, steps 3a–3j and 3m–3n. In the exemplary embodiment, what differs is illustrated as steps 4k–4n.

At step 4k, RPAS 28 may send a position request to MPC 20 to learn the position of the mobile station that has the destination telephone number at issue. In response, at step 4L, MPC 20 may send a position request to PDE 24 seeking the position corresponding to the destination telephone number. At step 4m, PDE 24 may respond to MPC 20 with the requested destination position information. In turn, at step 4n, MPC 20 may return the requested destination position information to RPAS 20.

An exemplary embodiment of the present invention has been illustrated and described. It will be understood, however, that changes and modifications may be made to the invention without deviating from the spirit and scope of the invention, as defined by the following claims.

I claim:

1. A method of responding to a route planning service request initiated from a first mobile station, the first mobile station being located at a first mobile station position, the route-planning service request defining an identifying-parameter, the method comprising, in combination:
identifying the first mobile station position based on the identifying-parameter;
receiving a destination telephone number, wherein the destination telephone number is a telephone number of a second mobile station;
identifying a destination position corresponding to the destination telephone number;
generating or obtaining a route plan for travel from the first mobile station position to the destination position; and
conveying the route plan for receipt by a person.

2. A method as claimed in claim 1, wherein the first mobile station comprises a device selected from the group consisting of a wireless telephone, a personal digital assistant, a pager, and a personal computer.

3. A method as claimed in claim 1, wherein the identifying-parameter comprises a code uniquely identifying the first mobile station.

4. A method as claimed in claim 3, wherein the identifying-parameter comprises an IP address.

5. A method as claimed in claim 1, wherein the identifying-parameter comprises a code uniquely identifying the route planning service request.

6. A method as claimed in claim 1, wherein the identifying-parameter comprises a code identifying a communication session in which the first mobile station requests the route plan.

7. A method as claimed in claim 1, wherein identifying the first mobile station position based on the identifying-parameter comprises (i) a mobile positioning system determining the position of the first mobile station, and (ii) a machine querying the mobile positioning system by a query keyed to the identifying-parameter so as to obtain the first mobile station position determined by the mobile positioning system.

8. A method as claimed in claim 1, wherein receiving a destination telephone number comprises receiving the destination telephone number from the person via the first mobile station.

9. A method as claimed in claim 1, wherein receiving a destination telephone number comprises (i) a machine engaging in a dialog with the person via a communications link with the first mobile station and (ii) the machine receiving the destination telephone number from the person through the dialog.

10. A method as claimed in claim 9, wherein the dialog comprises a data session.

11. A method as claimed in claim 10, wherein engaging in the dialog comprises the first mobile station displaying a data form in which the person enters the destination telephone number, and the first mobile station conveying the entered destination telephone number to the machine.

12. A method as claimed in claim 10, wherein conveying the route plan for receipt by a person comprises conveying the route plan to the person via the data session.

13. A method as claimed in claim 9, wherein the dialog comprises a voice session.

14. A method as claimed in claim 13, wherein engaging in the dialog comprises a machine verbally asking the person for the destination telephone number and the person responsively providing the destination telephone number to the machine by a voice-band message.

15. A method as claimed in claim 13, wherein conveying the route plan for receipt by a person comprises conveying the route plan to the person via the data session.

16. A method as claimed in claim 1, wherein identifying a destination position corresponding to the destination telephone number comprises a machine querying a location system for the destination position by a query keyed to the destination telephone number.

17. A method as claimed in claim 16, wherein the location system comprises a mobile positioning system, whereby the mobile positioning system may responsively determine a location of the second mobile station and return the location to the machine as the destination position.

18. A method as claimed in claim 1, wherein the first mobile station position is represented as latitude and longitude information, the method further comprising converting the first mobile station position to a street address corresponding to the latitude and longitude.

19. A method as claimed in claim 1, wherein the destination position is represented as latitude and longitude information, the method further comprising converting the destination position to a street address corresponding to the latitude and longitude.

20. A method as claimed in claim 1, wherein generating a route plan for travel from the first mobile station position to the destination position comprises applying a routing engine, the routing engine receiving as input the first mobile station position and the destination position and providing as output a route plan.

21. A method as claimed in claim 20, wherein applying the routing engine comprises sending a service request to a routing engine.

22. A method as claimed in claim 21, wherein the routing engine comprises a routing engine selected from the group consisting of (a) MapQuest.com, (b) Mapsonus.com, and (c) Mapblast.com.

23. A method as claimed in claim 20, wherein applying the routing engine comprises running a software application programmed to compute a route from a starting position to a destination position.

24. A method as claimed in claim 1, wherein conveying the route plan for receipt by a person comprises conveying the route plan to the person via an IP network connection.

25. A method as claimed in claim 1, wherein conveying the route plan for receipt by a person comprises conveying the route plan to the person via a service selected from the group consisting of voice mail, e-mail and short message service.

26. A method as claimed in claim 25, wherein conveying the route plan for receipt by a person is selected from the group consisting of a human reciting the route plan to the person audibly over a telecommunications connection and a machine reciting the route plan to the person audibly over a telecommunications connection.

27. A method as claimed in claim 25, wherein conveying the route plan to the person via short message service comprises conveying the route plan in a sequence of short text messages.

28. A method as claimed in claim 1, wherein conveying the route plan for receipt by a person comprises sending the route plan to a machine for later retrieval by the person.

29. A method for assisting a mobile station user to get from a current first mobile station position to a destination position, the method comprising, in combination:

receiving a route planning service request and responsively initiating a route planning session;

generating a mobile station position inquiry, whereby the mobile station position inquiry may be forwarded to a mobile positioning system to establish the mobile station position;

receiving, in response to the mobile station position inquiry, an indication of the first mobile station position;

receiving a destination telephone number, wherein the destination telephone number is a telephone number of a second mobile station;

initiating an inquiry to identify a destination position corresponding to the destination telephone number;

generating a route plan for travel from the first mobile station position to the destination position;

conveying the route plan for receipt by the user;

whereby the route plan may assist the user to travel from the first mobile station position to the destination position.

30. A method as claimed in claim 29, wherein conveying the route plan for receipt by the user comprises sending the route plan to a machine for later retrieval by the user.

31. In a telecommunications network, a route planning application server for assisting a mobile station user to get from a current first mobile station position to a destination position, the route planning application server comprising, in combination:

a processor;

a data storage medium;

a first set of machine language instructions stored in the data storage medium and executable by the processor for receiving a route planning service request and responsively initiating a route planning session;

a second set of machine language instructions stored in the data storage medium and executable by the processor for providing a mobile station position inquiry and for receiving in response an indication of the mobile station position, whereby the mobile station position inquiry may be forwarded to a mobile positioning system for identification of the first mobile station position;

a third set of machine language instructions stored in the data storage medium and executable by the processor for receiving a destination telephone number and for responsively initiating an inquiry to identify a destination position corresponding to the destination telephone number, wherein the destination telephone number is a telephone number of a second mobile station;

a fourth set of machine language instructions stored in the data storage medium and executable by the processor for generating a route plan for travel from the first mobile station position to the destination position;

a fifth set of machine language instructions stored in the data storage medium and executable by the processor for providing the route plan for receipt by the user;

whereby the route plan may assist the user to travel from the first mobile station position to the destination position.

32. A method comprising:

receiving a route planning request;

receiving a destination telephone number, wherein the destination telephone number is a telephone number of a first mobile station;

determining a second mobile station location;

based on the second mobile station location and the destination telephone number, establishing a route plan for travel from the mobile station location to a location corresponding to the destination telephone number; and providing the route plan.

* * * * *